(12) United States Patent
Menon et al.

(10) Patent No.: US 9,201,448 B2
(45) Date of Patent: Dec. 1, 2015

(54) OBSERVING EMBEDDED SIGNALS OF VARYING CLOCK DOMAINS BY FOWARDING SIGNALS WITHIN A SYSTEM ON A CHIP CONCURRENTLY WITH A LOGIC MODULE CLOCK SIGNAL

(75) Inventors: Sankaran M. Menon, Austin, TX (US); Binta M. Patel, Austin, TX (US); Bo Jiang, Austin, TX (US); Nancy G. Woodbridge, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 13/536,148

(22) Filed: Jun. 28, 2012

(65) Prior Publication Data

US 2014/0006836 A1    Jan. 2, 2014

(51) Int. Cl.
*G06F 1/12* (2006.01)
*G06F 13/42* (2006.01)

(52) U.S. Cl.
CPC ........................................ *G06F 1/12* (2013.01)

(58) Field of Classification Search
CPC ........................................................ G06F 1/12
USPC ........................................................ 713/400
See application file for complete search history.

(56) References Cited

U.S. PATENT DOCUMENTS

| | | | |
|---|---|---|---|
| 8,028,209 B2 | 9/2011 | Li et al. | |
| 2005/0149892 A1* | 7/2005 | Yee | 716/4 |
| 2008/0229136 A1* | 9/2008 | Chelstrom et al. | 713/400 |
| 2008/0244299 A1* | 10/2008 | Tune et al. | 713/401 |
| 2010/0268978 A1* | 10/2010 | Kelly | 713/500 |
| 2010/0332928 A1* | 12/2010 | Li et al. | 714/731 |
| 2011/0078483 A1* | 3/2011 | Islam | 713/400 |
| 2013/0173751 A1* | 7/2013 | Zachos | 709/219 |

* cited by examiner

*Primary Examiner* — Thomas Lee
*Assistant Examiner* — Robert Cassity
(74) *Attorney, Agent, or Firm* — Trop, Pruner & Hu, P.C.

(57) ABSTRACT

Observability of internal system-on-chip signals is a difficult problem and it is particularly difficult to observe and debug transactions with different clock domains. However, one embodiment provides observability of internal signals from multiple internal blocks having varying clock domains such as synchronous (common clock) and asynchronous (non common clock) domains. An embodiment provides simultaneous observability of debug data from both synchronous and asynchronous clock domains. An embodiment may also allow sending debug data from both synchronous and asynchronous domains from the SoC. One embodiment outputs internal signals on output pins of the SoC, thereby allowing transactions from one clock domain to be tracked to another clock domain and allowing for the determination of the relationship between the data of differing clock domains. Other embodiments are described herein.

21 Claims, 8 Drawing Sheets

OBSERVING EMBEDDED SIGNALS OF VARYING CLOCK DOMAINS BY FOWARDING SIGNALS WITHIN A SYSTEM ON A CHIP CONCURRENTLY WITH A LOGIC MODULE CLOCK SIGNAL

BACKGROUND

In the design of a system-on-chip (SoC) there are several design methodologies, such as design for test (DFT), design for manufacturing (DFM), and design for debug (DFD), collectively known as DFX, for example, that can be used to increase the testability, fault coverage and manufacturing yield of the SoC. DFX may include design modifications that provide improved access to internal circuit elements such that the local internal state can be observed (observability) more easily. The design modifications can be strictly physical in nature (e.g., adding a physical probe point to a network or "net") and/or may include adding active circuit elements to facilitate observability (e.g., inserting a multiplexer "mux" into a net).

For example, design modifications may be made to facilitate testing a single logic gate at a moment in time. However, most gates are deeply embedded whereas the test equipment is typically connected to the primary Input/outputs (I/Os) and/or some physical test points. The embedded gates, hence, must be manipulated through intervening layers of logic. If the intervening logic contains state elements, then the issue of an exponentially exploding state space and state transition sequencing causes difficulties for testing.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements cooperate or interact with each other, but they may or may not be in direct physical or electrical contact. Also, while similar or same numbers may be used to designate same or similar parts in different figures, doing so does not mean all figures including similar or same numbers constitute a single or same embodiment.

Observability of internal SoC signals is a difficult problem and it is particularly difficult to observe and debug transactions with different clock domains. However, one embodiment provides observability of internal signals from multiple internal blocks having varying clock domains. One such domain may include a common clock domain (e.g., SoC clock domain). Observability of signals for the common clock domain is sometimes referred to herein as synchronous node observability architecture (NOA), Sync NOA, and/or Sync_NOA. Another such domain, sometimes referred to herein as an intellectual property (IP) clock domain, may concern signals that are not synchronous with the common clock domain. Observability of signals for an IP clock domain is sometimes referred to herein as asynchronous NOA, Async NOA, Async_NOA, IP NOA, and/or IP_NOA. An embodiment provides simultaneous observability of debug data from both common clock and IP clock domains using Sync NOA and IP NOA, sometimes referred to herein as "SIP_NOA" or SIP NOA (as an abbreviation of Sync and IP NOA). An embodiment may also allow sending debug data from both synchronous and asynchronous domains from the SoC. One embodiment outputs internal signals on output pins of the SoC, thereby allowing transactions from one clock domain to be tracked to another clock domain and allowing for the determination of the relationship between the data of differing clock domains. Thus, advantages of various embodiments include, without limitation, the ability to not only observe internal signals but also to be able to determine the timing relationships between the various clock domains in a complex SoC or a chip. This facilitates debugging and reduces debug time to bring a product to market more quickly.

Figure 1:
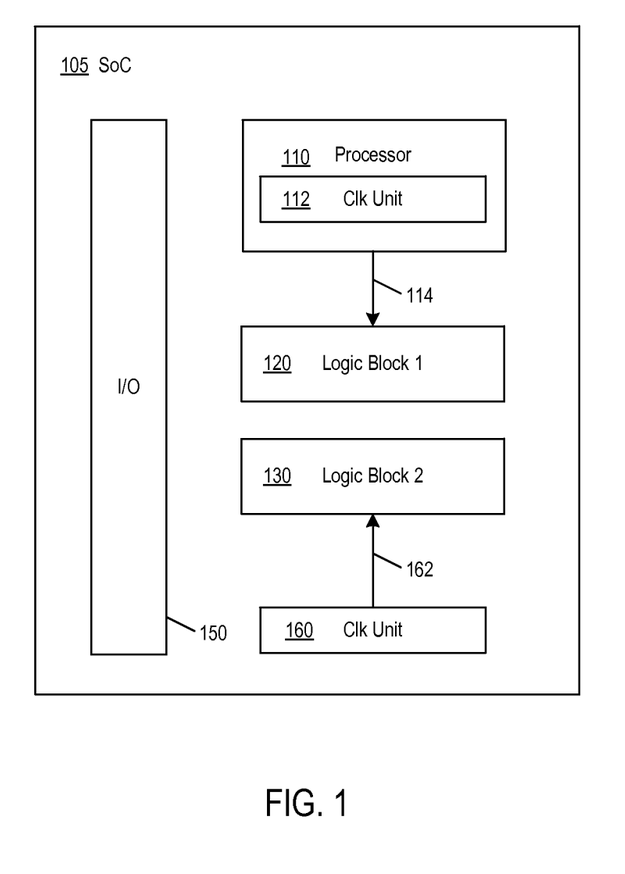
FIG. 1 illustrates a SoC in an embodiment of the invention.

FIG. 1 illustrates a SoC in an embodiment of the invention. SoC 105 has a processor 110 with clock (CLK) unit 112 that provides CLK signal 114 to logic block 1 120. SoC 105 also has CLK unit 160 that provides CLK signal 162 to logic block 2 130. I/O block or pad 150 controls the external access(es) to SoC 105.

Figure 2:
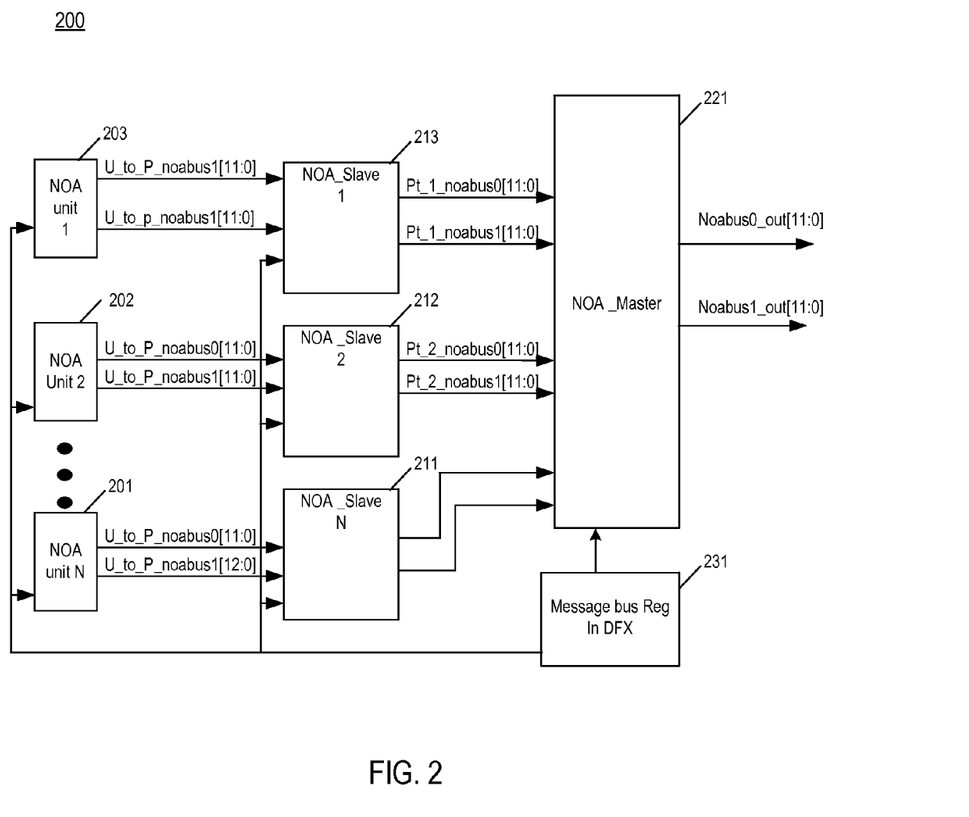
FIG. 2 includes an embodiment of a synchronous observability apparatus in an embodiment of the invention.

FIG. 2 includes an embodiment of a synchronous observability apparatus in an embodiment of the invention. More specifically, FIG. 2 includes one embodiment that has NOA units 201, 202, 203, NOA slave units 211, 212, 213, and NOA Master unit 221 used for Sync NOA. Element 231 includes registers that store information (e.g., select signals) for muxs in NOA units 201, 202, 203, NOA slave units 211, 212, 213, and NOA Master unit 221. The data exchanged between NOA units 201, 202, 203, NOA slave units 211, 212, 213, and NOA Master unit 221 is explained in greater detail in association with FIGS. 3-5. In one embodiment Sync NOA provides the capacity to observe the outputs of the common clock domain in SoC 105, such as the core clock 112 (or the most pervasive clock in the SoC or chip).

In one embodiment, NOA units 201, 202, 203 are inserted at the unit level (e.g., lower architectural level) and use varying numbers of inputs (e.g., 24 to 384 or more or less inputs). Signals of interest useful for debug are identified and are connected at this level. In some embodiments, NOA slave units 211, 212, 213 are utilized at the partition level and exist in one or more clusters of units. The final NOA unit, also referred to as NOA Master 221, interfaces to the NOA slave units. Embodiments exist that use some, none, or all of NOA units, NOA slave units, and a NOA master unit. Other embodiments are not so limited. For example, the NOA slave unit can be included in another unit that is placed closer to the NOA master unit to address timing relationships between a NOA unit and a NOA master unit. Thus, in this example the NOA slave unit can be included at the next hierarchy level (partition level) or could be implemented included in a unit (unit level) that is in between the NOA unit and the NOA Master unit. Other embodiments are not so limited.

Figure 3:
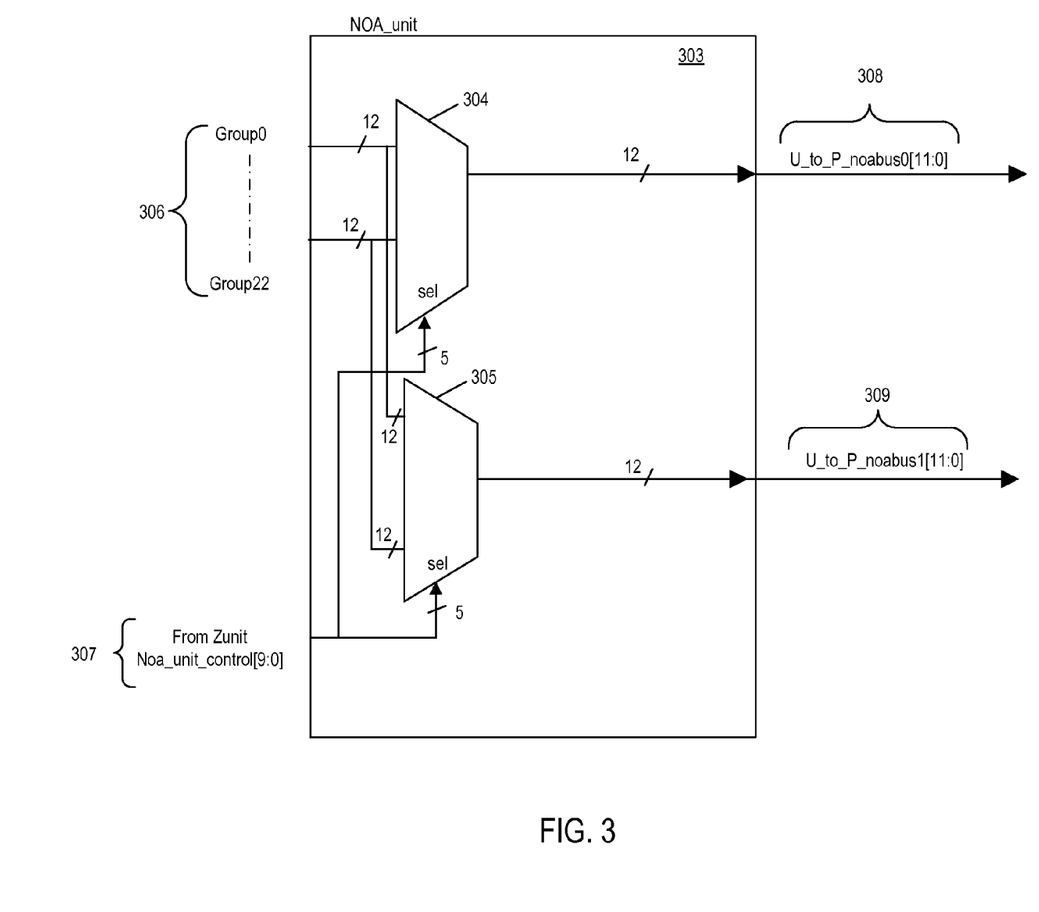
FIG. 3 includes an embodiment of a synchronous observability apparatus in an embodiment of the invention.

FIG. 3 includes an embodiment of a synchronous observability apparatus in an embodiment of the invention. The observability nodes in various blocks and their related signals 306 are coupled to the inputs of NOA unit 303 (see units 201, 202, 203 of FIG. 2), which include x bits each on y sets (e.g., Group0) of mux (304, 305) inputs. The exact number of bits and sets of input signals 306 can vary and be optimized for each SoC. In one embodiment, NOA unit 303 defines a "group" of data inputs as 12 bits of data in the core clock domain and each NOA unit allows for observation of up to 32 groups of data based on the number of select lines which may be, for example, 5 bits. Other embodiments are not so limited.

In one embodiment, output data 308, 309, or any other output data for that matter, may not include clock data (e.g., core clock data) as this information is available elsewhere in the SoC. In one embodiment, the common clock is balanced and is available at the final DFX block (block 747 of FIG. 7). By being balanced the common clock signal has generally the same delay regardless of the signals location on the SoC die and its distance from the common clock. Thus, the common clock signal is tapped "downstream" of the NOA unit and may be sent out of chip I/O 150. As explained further in FIG. 6, the 1X clock data (i.e., clock data clocked at the main clock rate) may be accessed in the analog physical (PHY) OSI layer outside of NOA unit 303. For the example of FIG. 3, 12 bit data groups 308, 309 are each are sent out from unit 303. Other embodiments are not so limited.

Due to pin limitations at the SoC I/O (e.g., unit 150), the 24 bits of signals 308, 309 may be pumped (e.g., double pumped) in the analog Phy layer. Double pumping may include, for example, operating with double data rate transfers of data on both the rising and falling edges of a clock signal. By using both edges of the clock the data signals operate with the same limiting frequency but double the data transmission rate. Other embodiments may include quad pumping where data are transmitted at four points in the clock cycle (e.g., on the rising and falling edges of the clock cycle and at two intermediate points between the edges, such as points defined by a second clock that is 90° out of phase from the first clock). The effect is to deliver four bits of data, per signal line, per clock cycle. In a quad pump data rate system, the data lines operate at twice the frequency of the clock signal (which is in contrast to double pump data rate systems where the clock and data lines operate at the same frequency). Thus "n" pumping (pumping at nX) allows the Sync NOA to communicate at higher data rates (e.g., 400 MT/s to 1600 MT/s or higher) while maintaining a lower and more stable actual clock frequency (e.g., 100 MHz to 400 MHz or higher). Other embodiments may include other versions of pumping and data rate acceleration (e.g., x6, x8, x10 and the like).

In one embodiment control signals 307 for "muxing" either of muxs 304, 305 come from DFX fabric registers (e.g., Intel® On-Chip System Fabric) (e.g., block 231 of FIG. 2). In an embodiment, data groups 308, 309 output from unit 303 belong to the same main clock domain. Hence, signals 306 chosen for NOA observability are 1X (i.e., are clocked with the main clock domain). Other embodiments are not so limited.

Figure 4:
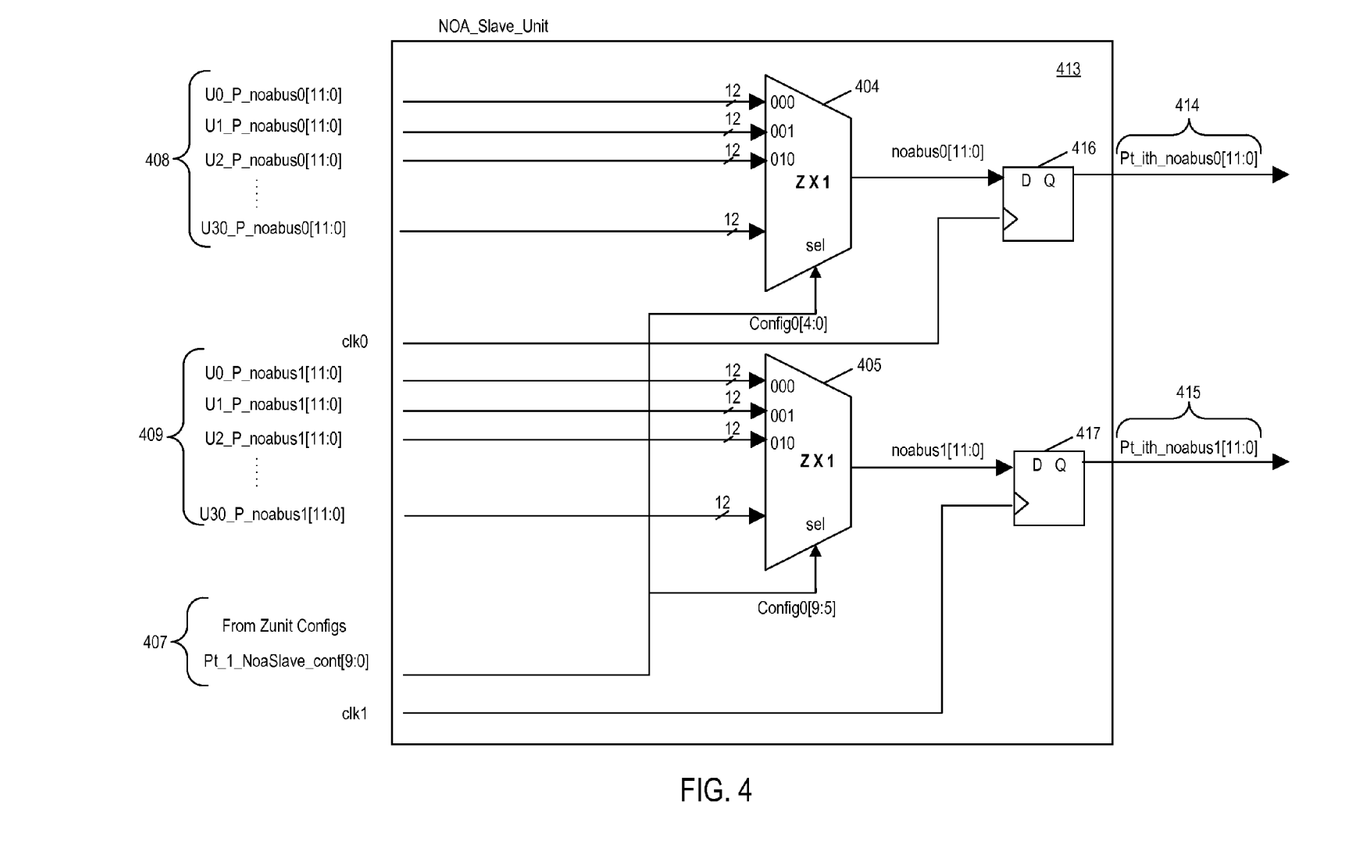
FIG. 4 includes an embodiment of a synchronous observability apparatus in an embodiment of the invention.

FIG. 4 includes an embodiment of a synchronous observability apparatus in an embodiment of the invention. NOA slave unit 413 reduces the amount of networks (nets) that need to be routed from NOA units 201, 202, 203 to NOA Master unit 221. In one embodiment control signals 407 come from DFX fabric registers (block 231 of FIG. 2). NOA slave unit 413 performs muxing functions (via muxs 404, 405) for inputs from NOA unit and, in one embodiment, supports 32 NOA unit inputs (408, 409). Other embodiments are not so limited. In one embodiment slave unit 413 generates two 12 bit vectors 414, 415 to be sent to Master unit 221. In one embodiment, flip flop units 416, 417 are respectively gated by signals clk0 and clk1. Thus, in one embodiment clock signals related the SoC clock may be forward (independently or along with debug data). In FIG. 2 the debug data is stored in one of flip flops 416, 417 and then clocked respectively by clk0 and clk1 to help counter any delays that may occur in clocking signals and the like. For example, if a NOA unit providing signals to mux 404 is more distantly located on the die from mux 404 than another NOA unit feeding mux 405 is located relative to mux 405, then providing the clock signals may be helpful for synchronization purposes. However, as indicated above other embodiments do not require these clock signals for Sync NOA debug data.

Figure 5:
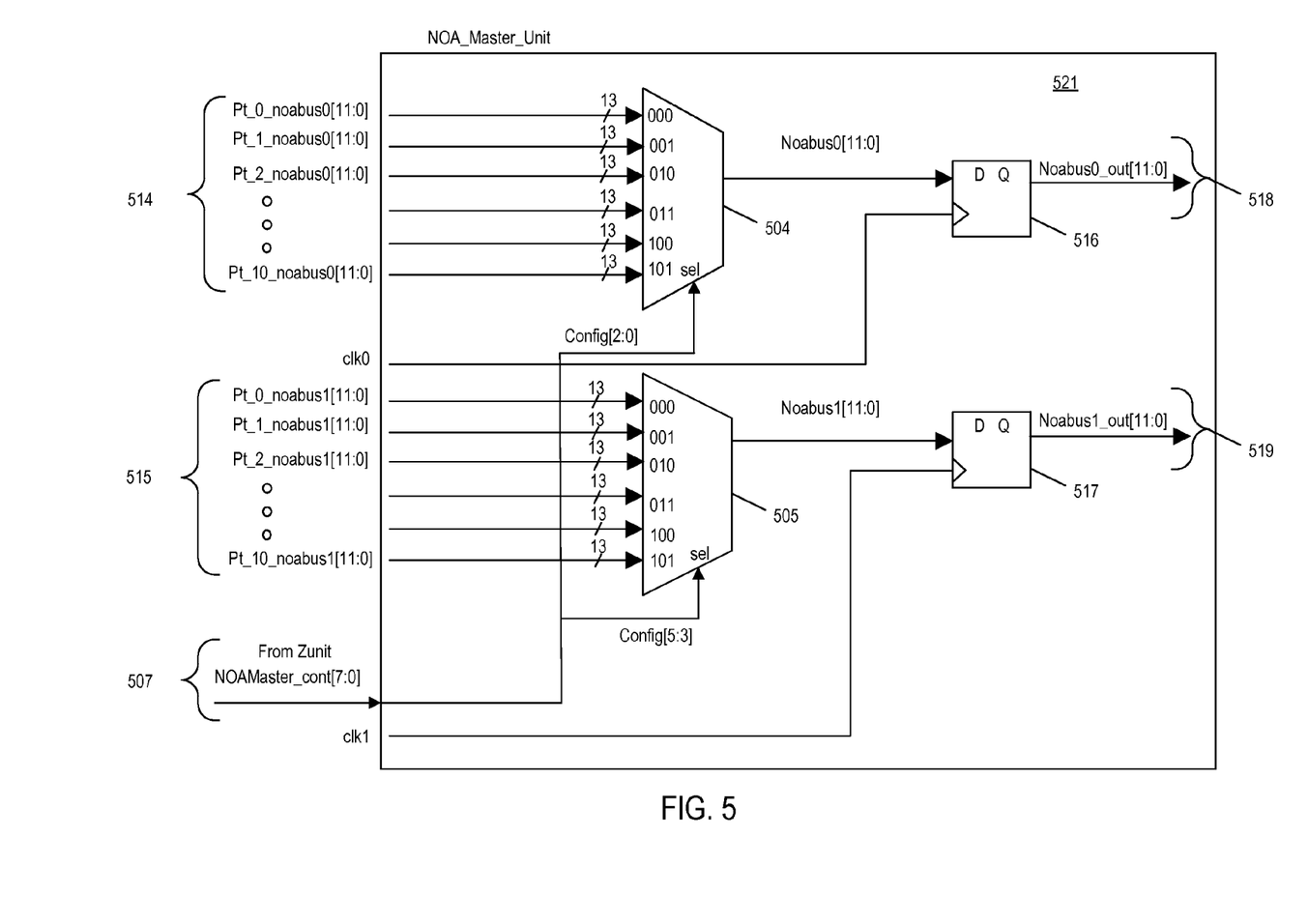
FIG. 5 includes an embodiment of a synchronous observability apparatus in an embodiment of the invention.

FIG. 5 includes an embodiment of a synchronous observability apparatus in an embodiment of the invention. In one embodiment NOA Master unit 521 does the final muxing (via muxs 504, 505) of inputs 514, 515 from NOA slave units 211, 212, 213. In one embodiment 24 bits of NOA master output data (518, 519) is clocked by a 200 MHz SOC core clock (e.g., unit 112) and is double pumped to 12 bits of NOA data at 400 MTS in I/O 150. Other embodiments are not so limited. Control signals 507 to NOA Master unit 521 come from DFX unit 231. In one embodiment, flip flop units 516, 517 are respectively gated by signals clk0 and clk1 for similar reasons explained above regarding flip flops 416, 417.

Figure 6:
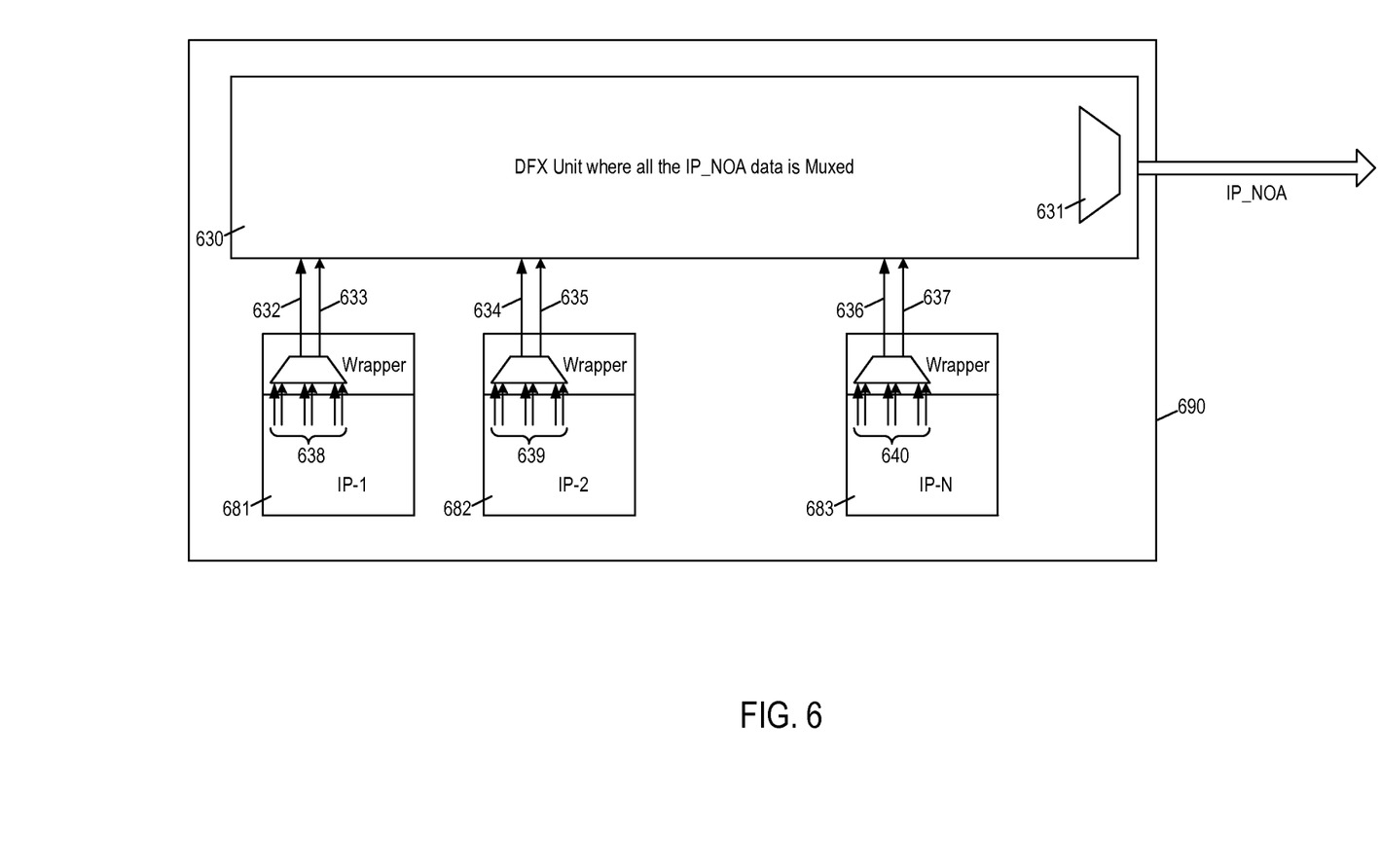
FIG. 6 includes an embodiment of an asynchronous observability apparatus in an embodiment of the invention.

FIG. 6 includes an embodiment of an asynchronous observability apparatus in an embodiment of the invention. In an embodiment Async or IP NOA 690 consists of the capability to observe the outputs of an IP clock domain in SoC 105, such as IP clock unit 160. IP NOA 690 is for the non-core clock domain signals and the data is sent out from many logic blocks using non-core clock domain clocks such as, for example, GFX (graphics logic), VED (video decoder logic), VEC (video encoder logic), ISP (imaging subsystem processor), MIPI (Mobile Industry Processor Interface), AONT (always on timer), and so on. Thus, IP NOA operates with various IP blocks that may each operate at different clock frequencies and at different ratios (e.g., different division ratios (divide by 2, by 3, and the like) used to program a phase locked loop clocking mechanism). Hence, observation of these signals cannot easily be combined with the Sync NOA signals. In one embodiment the data from various IP blocks are separated out and connected to a DFX unit, where the IP NOA signals are taken and muxed out to pins. Like Sync NOA, the exact number of signals and output pins for observability can be optimized for each SoC. By selecting/programming the output mux appropriately, the IP NOA data can be sent out through the IP NOA pins. The SoC integrator may select the pins for muxing these IP NOA signals. Along with the IP NOA data, the respective IP NOA clocks are also sent out of the SoC in one embodiment.

Regarding FIG. 6 specifically, debug signals 638, 639, 640 from the non-1x SoC core clock domain (i.e., asynchronous or IP core clock) are brought to IP (or asynchronous) NOA 690 ports. These IP NOA node signals 638, 639, 640 are from IP block IP-1 (681, such as GFX), IP-2 (682, such as VED) and IP-N (683, such as MIPI) and the like (all of which may be operating a different clock rates which are all unequal to the main SoC clock rate). In one embodiment, each of IP blocks 681, 682, 683 sends out 8 bit IP NOA debug data 632, 634, 636 along with corresponding clock signals 633, 635, 637 muxed in respective wrapper logic. (In one embodiment, this wrapper logic may be for an IP block that generally prohibits manipulation of the block's internal logic but allows some modification of outside logic that "wraps" the block (e.g., to address pin logic). In on embodiment, the muxs of blocks 681, 682, 683 are located "in" this wrapper logic.) The 8 bit output, along with its clock signal from the output of the wrapper logic, is sent to DFX block 630, and then to IP NOA mux 631 before being output from IP NOA 690. In one embodiment the select signals to IP NOA 790 muxs are sent from a DFX functional block and are programmed via fabric registers. Other embodiments are not so limited.

Figure 7:
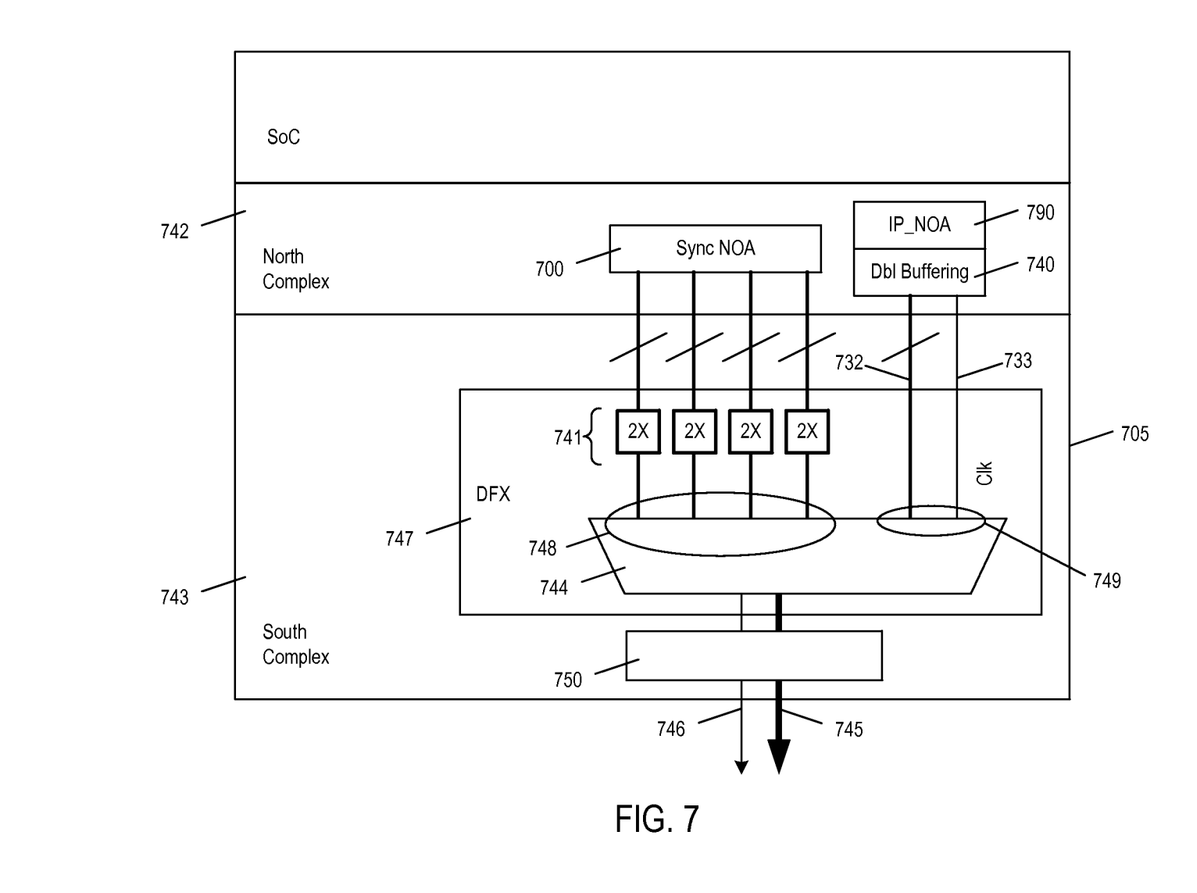
FIG. 7 includes an embodiment of a synchronous and asynchronous observability apparatus in an embodiment of the invention.

FIG. 7 includes an embodiment of a synchronous and asynchronous observability apparatus in an embodiment of the invention. IP NOA 790 (located in "North complex" 742 of SoC 705) outputs debug data to double buffering logic 740. In one embodiment the output is double buffered to synchronize with other clocks. As a result of double buffering, for example, 17 bit (16 bit data+1 bit clock) signals 732, 733 are sent to DVX block 747 located in "South complex" 743 of SoC 705. Regarding double buffering, in one embodiment I/O interface 750 runs at 400 MTS and a graphics IP block (e.g., block 130) runs at 600 MHz and outputs 8 bits of NOA data. The 8 bit data at 600 MHz cannot be output on to the pins running at 400 MT. Consequently, an embodiment may use a clock divider and two buffers (i.e., double buffering) with odd and even data being written to a ping pong buffer and then read out. This may convert to 600 MHz and outputs 8 bits of NOA data to 300 MHz and outputs 16 bits of data (which are compatible with I/O interface 750). Clock data 746 may also be output from I/O block or pad 750. Other embodiments may buffer at different rates to lower the data rate to greater or lesser levels.

Thus, the embodiment of FIG. 7 provides simultaneous observability of Sync NOA and IP NOA (to provide SIP NOA) on two different sets of outputs 748, 749 where these outputs are muxed out via mux 744 and its corresponding pins. Sync NOA 700 signals may be double pumped (741), quad pumped or "n" pumped (e.g., 8x, 16x, and the like) to reduce the number of pins that are required at the full chip or SoC. If there are sufficient pins at the SoC level, an embodiment may not perform pumping. If the Sync NOA data is pumped, the output data (745) captured on, for example, a logic analyzer needs to be unpumped. To save additional pins at the full chip level or SoC level, the IP NOA 790 pins can be muxed, via mux 744, and sent out via the same set of pins (e.g., I/O 750) as the Sync NOA signals. In one embodiment this enables both Sync NOA output and IP NOA outputs to be observable via the same pins.

Various embodiments enable observing both Sync NOA outputs and IP NOA outputs simultaneously at the SoC or full chip output pins. This allows tracking of transactions from the Sync NOA output down to the IP NOA output or vice versa. Consequently, the SIP NOA scheme tracks transactions between various clock domains, which may be from Sync NOA to IP NOA as well as from IP NOA to Sync NOA. For example, in one embodiment a transaction starts from a SoC clock based block (i.e., Sync NOA clock) along with its debug data. The transaction may be meant to query a block that is based on an asynchronous clock (e.g., IP block) and the IP block may respond with a transaction (or a response to the SoC clock transaction). In such a case both the Sync NOA output and IP NOA output can be observed (which is essentially observing the response to the query sent by the SoC clock based block). This enables viewing both the query transaction from the SoC clock based block and the response transaction from the IP block or IP NOA outputs. This can be viewed vice versa (e.g., where there is a transaction from the IP NOA with a query to the SoC Clock based block). Thus, one embodiment combines Sync NOA with IP NOA to provide powerful debug capability not only to observe internal signals but also be able to determine the timing relationships between the various clock domains in a complex SoC or a chip.

Embodiments are not limited to any one type of SoC or processor architecture.

Figure 8:
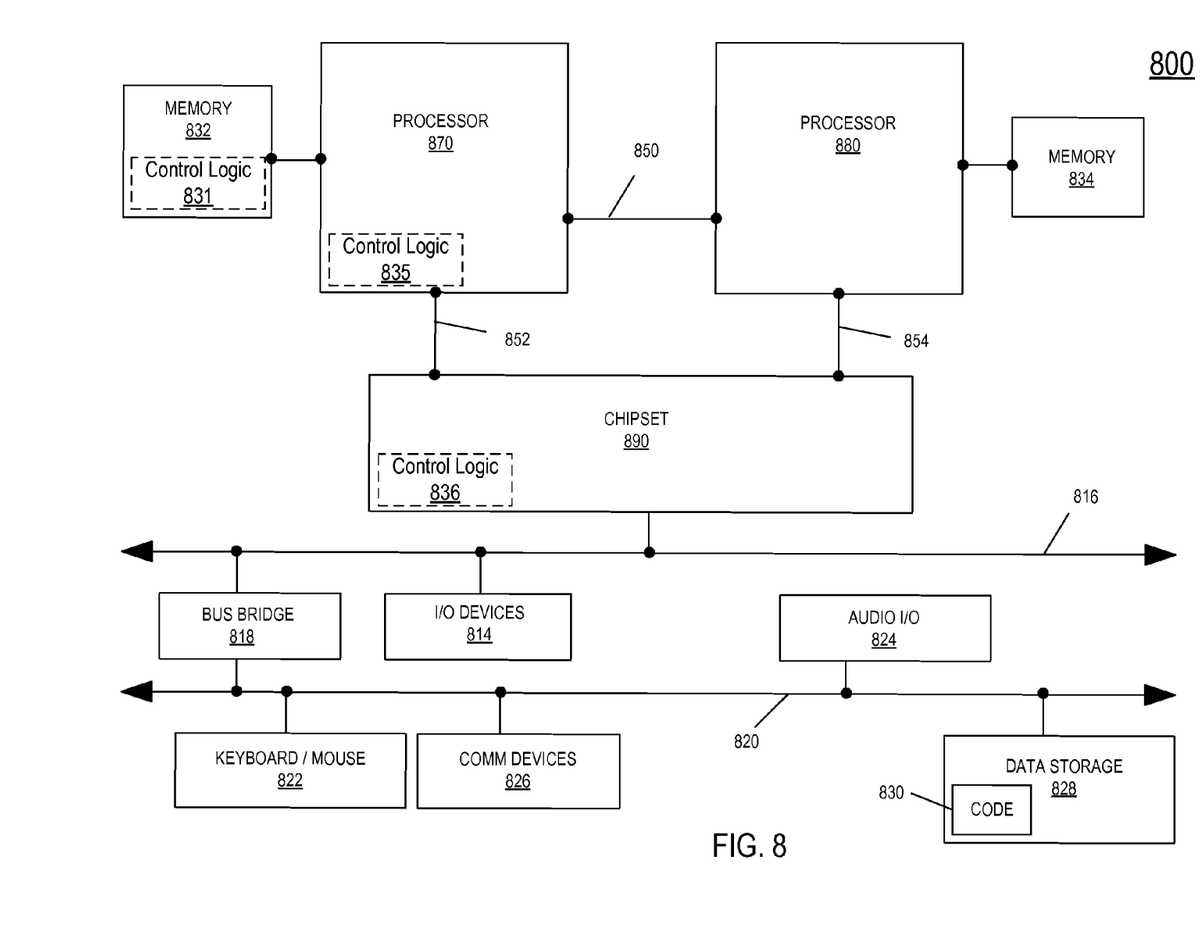
FIG. 8 includes a system for use with embodiments of the invention.

Embodiments may be implemented in many different system types. Referring now to FIG. 8, shown is a block diagram of a system in accordance with an embodiment of the present invention. Multiprocessor system 800 is a point-to-point interconnect system, and includes a first processor 870 and a second processor 880 coupled via a point-to-point interconnect 850. Each of processors 870 and 880 may be multicore processors. The term "processor" may refer to any device or portion of a device that processes electronic data from registers and/or memory to transform that electronic data into other electronic data that may be stored in registers and/or memory. First processor 870 may include a memory controller hub (MCH) and point-to-point (P-P) interfaces. Similarly, second processor 880 may include a MCH and P-P interfaces. The MCHs may couple the processors to respective memories, namely memory 832 and memory 834, which may be portions of main memory (e.g., a dynamic random access memory (DRAM)) locally attached to the respective processors. First processor 870 and second processor 880 may be coupled to a chipset 890 via P-P interconnects, respectively. Chipset 890 may include P-P interfaces. Furthermore, chipset 890 may be coupled to a first bus 816 via an interface. Various input/output (I/O) devices 814 may be coupled to first bus 816, along with a bus bridge 818, which couples first bus 816 to a second bus 820. Various devices may be coupled to second bus 820 including, for example, a keyboard/mouse 822, communication devices 826, and data storage unit 828 such as a disk drive or other mass storage device, which may include code 830, in one embodiment. Code may be included in one or more memories including memory 828, 832, 834, memory coupled to system 800 via a network, and the like. Further, an audio I/O 824 may be coupled to second bus 820.

Embodiments may be implemented in code and may be stored on storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. In one embodiment, use of the term control logic includes hardware, such as transistors, registers, or other hardware, such as programmable logic devices (835). However, in another embodiment, logic also includes software or code (831). Such logic may be integrated with hardware, such as firmware or microcode (836). A processor or controller may include control logic intended to represent any of a wide variety of control logic known in the art and, as such, may well be implemented as a microprocessor, a microcontroller, a field-programmable gate array (FPGA), application specific integrated circuit (ASIC), programmable logic device (PLD) and the like.

Thus, an embodiment includes a SoC comprising different clock domains; a first node to receive a first internal signal (e.g., signal 306), which originates within the SoC and is synchronous with the first clock domain, and output the first signal from the SoC (e.g., via I/O 750); and a second node to receive a second signal (e.g., signal 638), which originates within the SoC and is asynchronous to the first clock domain, and output the first signal from the SoC (e.g., via I/O 750); wherein the first and second nodes are to concurrently receive the first and second signals. The nodes may be within, for example, mux 750, DFX 747, IP NOA 790, Sync NOA 700, and the like. "Concurrent" as used herein may be signals are received at the same time, are received at different times but stored at the same time, and the concurrently received signals may be output at the same or differing times. Thus, "concurrently receive" is not meant to limit any embodiment to a situation where the nodes must receive signals at the exact same moment in time as the embodiment described herein on clearly not that narrow in nature.

As indicated in various embodiments herein, Sync NOA need not forward its debug signals (e.g., 308) along with a core clock signal because, for example, the core clock signal will be available elsewhere downstream. However, in some embodiments an IP NOA may forward debug data along with its clock signal (e.g., signals 632, 633). This does not mean such signals must be in transmission at the exact same moment in time, sent as the exact same moment in time, received at the exact same moment in time, and the like.

Also, in an embodiment a multiplexor, in a first orientation may allow the SoC to concurrently output the first and second signals from the SoC (provide there are pins to allow this) and in a second orientation the SoC outputs only one of the first and second signals from the SoC (i.e., muxing to send a first signal and then a second signal). In other embodiments, there may be no muxing at all provided there are pins to allow for signal distribution.

Also, an embodiment may include at least one memory to store at least one of the IP NOA and SYNC NOA signals so such signals are retained for future use, may be sent at different times, and the like.

As used herein a "signal" includes a signal and its derivatives. For example, a signal includes a first and second instance of the signal to allow for storage, muxing, reproducing and the like. This treatment of "signal" is used to facilitate explanation of concepts and is not a limitation on various embodiments.

As used herein, a mux includes logic (e.g., software or hardware) that selects (e.g., via a select signal) one or more of several analog or digital input signals and forwards the selected input(s) along one or more lines. A multiplexer is a data selector. No particular orientation, circuit, or software is required or intended to limit embodiments of the invention.

In one embodiment a SoC comprises: first and second clock domains that are unequal to one another; a first node to receive a first signal, which originates within the SoC and is synchronous with the first clock domain, and output the first signal from the SoC; and a second node to receive a second signal, which originates within the SoC and is asynchronous to the first clock domain and synchronous to the second clock domain, and output the first signal from the SoC; wherein the first and second nodes are to concurrently receive the first and second signals. One embodiment comprises a processor core and a core clock, corresponding to the processor core and the first clock domain, to produce a core clock signal; and a logic module and a logic module clock, corresponding to the logic module and the second clock domain, to produce a logic module clock signal. In one embodiment the first signal is not forwarded, within the SoC, concurrently with the core clock signal. In one embodiment the second signal is forwarded, within the SoC, concurrently with the logic block clock signal. In one embodiment the second node is to receive the second signal concurrently with the logic block clock signal. In one embodiment the second node is to receive the second signal and the logic block clock signal from a DFX logic block. In one embodiment the control logic correlate the first signal with the second signal by determining a timing relationship between the first and second signals. In one embodiment the first signal is not forwarded, within the SoC, in parallel with the core clock signal and the second signal is forwarded, within the SoC, in parallel with the logic block clock signal. One embodiment comprises logic to at least double a transmission data rate of the first signal. One embodiment comprises buffer logic to decrease a transmission data rate of the second signal via buffering. In one embodiment the logic receives the core clock signal, which was not forwarded with the first signal, and at least doubles the data rate of the first signal based on the first signal and the core clock signal. One embodiment comprises a multiplexor, wherein in a first orientation of the multiplexor the SoC concurrently outputs the first and second signals from the SoC and in a second orientation the SoC outputs only one of the first and second signals from the SoC. One embodiment comprises selection logic, wherein in a first orientation of the selection logic the SoC outputs the first signal from the SoC via a first pin and in a second orientation the SoC outputs the second signal from the SoC via the first pin. In one embodiment the second signal and the logic block clock signal are both produced from a single multiplexor. In one embodiment the first clock domain include a common clock domain for the SoC and the core clock signal includes a common clock signal for the SoC. One embodiment comprises an additional clock domain unequal to either of the first and second clock domains; an additional logic module; and an additional logic module clock, corresponding to the additional logic module and the additional clock domain, to produce an additional logic module clock signal. In one embodiment the second node is to receive an additional signal, which originates within the SoC and is asynchronous to the first clock domain, and output the additional signal from the SoC concurrently with the first node outputting the first signal from the SoC. One embodiment comprises first multiplexor logic to select the first signal from a first plurality of signals, all clocked to the first clock domain, and forward the first signal to the first node without forwarding any clock signal; and second multiplexor logic to select the second signal from a second plurality of signals and forward the second signal to the second node along with the logic module clock signal. One embodiment comprises logic to provide simultaneous observability of the first and second signals, wherein the first and second signals each include debug data. One embodiment includes at least one memory to store at least one of the first and second signals before the at least one of the first and second signals is output from the SoC. In one embodiment the first and second nodes are to simultaneously receive the first and second signals at a first moment in time.

One embodiment includes a SoC comprising: first and second clock domains that are unequal to one another; a first node to receive a first signal, which originates within the SoC and is synchronous with the first clock domain, and output the first signal from the SoC; and a second node to receive a second signal, which originates within the SoC and is asynchronous to the first clock domain and synchronous to the second clock domain, and output the first signal from the SoC; wherein the first and second nodes are to concurrently store the first and second signals. One embodiment comprises: a processor core and a core clock, corresponding to the processor core and the first clock domain, to produce a core clock signal; and a logic module and a logic module clock, corresponding to the logic module and the second clock domain, to produce a logic module clock signal. In one embodiment the first signal is not forwarded, within the SoC, concurrently with the core clock signal and the second signal is forwarded, within the SoC, concurrently with the logic block clock signal. One embodiment comprises a multiplexor, wherein in a first orientation of the multiplexor the SoC concurrently outputs the first and second signals from the SoC and in a second orientation the SoC outputs only one of the first and second signals from the SoC. One embodiment comprises logic to provide simultaneous observability of the first and second signals, wherein the first and second signals each include debug data.

One embodiment includes a method executed by at least one processor comprising: a first node receiving a first signal, which originates within a SoC and is synchronous with a first clock domain, and outputting the first signal from the SoC; and a second node receiving a second signal, which originates within the SoC and is asynchronous to the first clock domain and synchronous to a second clock domain, and outputting the first signal from the SoC; wherein the first and second clock domains that are unequal to one another and the first and second nodes are to concurrently store the first and second signals. In one embodiment the SoC comprises a processor core and a core clock, corresponding to the processor core and the first clock domain, to produce a core clock signal; and a logic module and a logic module clock, corresponding to the logic module and the second clock domain, to produce a logic module clock signal. In one embodiment the method comprises not forwarding the first signal, within the SoC, concurrently with the core clock signal and forwarding the second signal, within the SoC, concurrently with the logic block clock signal.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on a chip (SoC) comprising:
   first and second clock domains that are unequal to one another;
   a first node to receive a first signal, which originates within the SoC and is synchronous with the first clock domain, and output the first signal from the SoC;
   a second node to receive a second signal, which originates within the SoC and is asynchronous to the first clock domain and synchronous to the second clock domain, and output the first signal from the SoC;
   a processor core and a core clock, corresponding to the processor core and the first clock domain, to produce a core clock signal; and
   a logic module and a logic module clock, corresponding to the logic module and the second clock domain, to produce a logic module clock signal;
   wherein (a) the first and second nodes are to concurrently receive the first and second signals, (b) the first signal is not forwarded, within the SoC, concurrently with the core clock signal, and (c) the second signal is forwarded, within the SoC, concurrently with the logic module clock signal.

2. The SoC of claim 1, wherein the second node is to receive the second signal concurrently with the logic module clock signal.

3. The SoC of claim 1, wherein the second node is to receive the second signal and the logic module clock signal from a DFX logic block.

4. The SoC of claim 1 comprising control logic to correlate the first signal with the second signal by determining a timing relationship between the first and second signals.

5. The SoC of claim 1, wherein the first signal is not forwarded, within the SoC, in parallel with the core clock signal and the second signal is forwarded, within the SoC, in parallel with the logic module clock signal.

6. The SoC of claim 1 comprising logic to at least double a transmission data rate of the first signal.

7. The SoC of claim 6 comprising buffer logic to decrease a transmission data rate of the second signal via buffering.

8. The SoC of claim 6, wherein the logic receives the core clock signal, which was not forwarded with the first signal, and at least doubles the data rate of the first signal based on the first signal and the core clock signal.

9. The SoC of claim 1 comprising a multiplexor, wherein in a first orientation of the multiplexor the SoC concurrently outputs the first and second signals from the SoC and in a second orientation the SoC outputs only one of the first and second signals from the SoC.

10. The SoC of claim 1 comprising selection logic, wherein in a first orientation of the selection logic the SoC outputs the first signal from the SoC via a first pin and in a second orientation the SoC outputs the second signal from the SoC via the first pin.

11. The SoC of claim 1, wherein the second signal and the logic module clock signal are both produced from a single multiplexor.

12. The SoC of claim 1, wherein the first clock domain includes a common clock domain for the SoC and the core clock signal includes a common clock signal for the SoC.

13. The SoC of claim 1 comprising:
an additional clock domain unequal to either of the first and second clock domains;
an additional logic module; and
an additional logic module clock, corresponding to the additional logic module and the additional clock domain, to produce an additional logic module clock signal;
wherein the second node is to receive an additional signal, which originates within the SoC and is asynchronous to the first clock domain, and output the additional signal from the SoC concurrently with the first node outputting the first signal from the SoC.

14. The SoC of claim 1 comprising:
first multiplexor logic to select the first signal from a first plurality of signals, all clocked to the first clock domain, and forward the first signal to the first node without forwarding any clock signal; and
second multiplexor logic to select the second signal from a second plurality of signals and forward the second signal to the second node along with the logic module clock signal.

15. The SoC of claim 1 comprising logic to provide simultaneous observability of the first and second signals, wherein the first and second signals each include debug data.

16. The SoC of claim 1 including at least one memory to store at least one of the first and second signals before the at least one of the first and second signals is output from the SoC.

17. The SoC of claim 1 wherein the first and second nodes are to simultaneously receive the first and second signals at a first moment in time.

18. A system on a chip (SoC) comprising:
first and second clock domains that are unequal to one another;
a first node to receive a first signal, which originates within the SoC and is synchronous with the first clock domain, and output the first signal from the SoC;
a second node to receive a second signal, which originates within the SoC and is asynchronous to the first clock domain and synchronous to the second clock domain, and output the first signal from the SoC;
a processor core and a core clock, corresponding to the processor core and the first clock domain, to produce a core clock signal; and
a logic module and a logic module clock, corresponding to the logic module and the second clock domain, to produce a logic module clock signal;
wherein the first and second nodes are to concurrently store the first and second signals;
wherein the first signal is not forwarded, within the SoC, concurrently with the core clock signal and the second signal is forwarded, within the SoC, concurrently with the logic module clock signal.

19. The SoC of claim 18 comprising a multiplexor, wherein in a first orientation of the multiplexor the SoC concurrently outputs the first and second signals from the SoC and in a second orientation the SoC outputs only one of the first and second signals from the SoC.

20. The SoC of claim 18 comprising logic to provide simultaneous observability of the first and second signals, wherein the first and second signals each include debug data.

21. A method executed by at least one processor comprising:
a first node receiving a first signal, which originates within a SoC and is synchronous with a first clock domain, and outputting the first signal from the SoC;
a second node receiving a second signal, which originates within the SoC and is asynchronous to the first clock domain and synchronous to a second clock domain, and outputting the first signal from the SoC; and
not forwarding the first signal, within the SoC, concurrently with a core clock signal and forwarding the second signal, within the SoC, concurrently with a logic module clock signal;
wherein the SoC comprises a processor core and a core clock, corresponding to the processor core and the first clock domain, that produces the core clock signal; and a logic module and a logic module clock, corresponding to the logic module and the second clock domain, that produces the logic module clock signal;
wherein the first and second clock domains are unequal to one another and the first and second nodes concurrently store the first and second signals.

* * * * *